United States Patent Office 3,480,117
Patented Nov. 25, 1969

3,480,117
DISK BRAKE
Sven Birger Ågren, Ornskoldsvik, and Björn A. H. Andersson and Nils Svante Andersson, Gullanget, Sweden, assignors to Aktiebolaget Hagglund & Soner, Ornskoldsvik, Sweden, a corporation of Sweden
Filed Apr. 1, 1968, Ser. No. 717,795
Int. Cl. F16d 65/84
U.S. Cl. 188—264                                1 Claim

ABSTRACT OF THE DISCLOSURE

A disk brake, particularly a steering brake for belt driven armored vehicles, has a brake surface made of a plate located upon a rotary brake disk as well as upon a relatively immovable brake disk. These plates consist of friction metal and have grooves provided upon their friction surfaces which are of such depth and intersect each other in such manner that the plate is divided into sections with cooling channels between the sections. Thus the rear surface of the plate located away from the friction surface is provided with raised portions to assure a comparatively high resistance to heat transmission between the plate and the machine part which carries it and also to provide channels for air cooling. The plate is provided only upon one of its radial edges with openings receiving connecting elements, such as screws.

---

This invention relates to a disk brake and refers more particularly to a steering brake for belt driven vehicles, with brake linings provided upon a brake disk.

Disk brakes, particularly those used, for example, for the braking of quick belt driven armored vehicles, are subject to extremely high heat strains, the maximum brake output being more than 500 kw. per disk. The result is that on the one hand, the brake linings are locked after a short time and, on the other hand, that they are deformed by the heat to such an extent that they must be replaced. Brake linings transmit substantial amounts of heat to the vehicle frame, particularly to parts surrounding the brake and connected therewith, so that they are affected by detrimental heat tensions. It was found that existing disk brakes cannot withstand these extremely high strains.

An object of the present invention is to eliminate these drawbacks of prior art constructions.

Other objects will become apparent in the course of the following specification.

In the accomplishment of the objectives of the present invention it was found desirable to construct the brake linings upon the rotary brake disk, as well as upon the relatively immovable brake disk cooperating therewith as plates made of friction metal and provided in the friction surface with grooves having such a depth and intersecting each other in such manner that the lining is divided into sections with cooling channels extending between the sections.

The invention will appear more clearly from the following detailed description when taken in connection with the accompanying drawing, showing by way of example, a preferred embodiment of the inventive idea.

Figure 1:
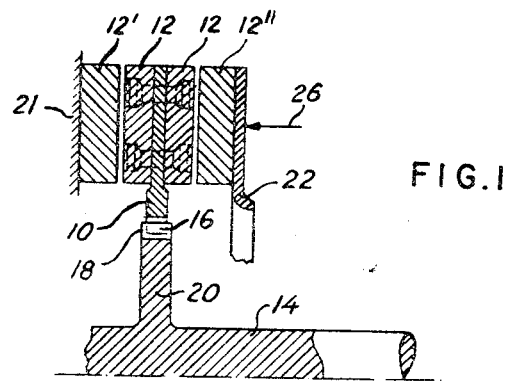
FIGURE 1 is a section through a brake constructed in accordance with the present invention.

The steering brake shown in the drawing includes a ring-shaped disk 10 which is provided upon both sides with brake linings 12 attached to the disk by rivets. The disk 10 is movable in the axial direction relatively to an axle 14 by being provided with splines or teeth 16 meshing with a toothed rim 18 of a flange 20 carried by the axle 14.

Figure 2:
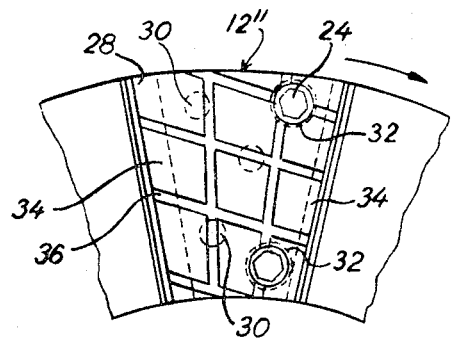
FIGURE 2 is a front view of a brake lining.
Figure 3:
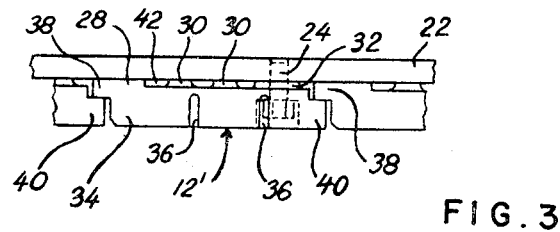
FIGURE 3 is a side view of the brake lining shown in FIG. 2.

Each of the two linings 12 is opposed by and cooperates with linings 12' and 12''. The lining 12' is fixed upon the machine stand 21 while the other lining 12'' is fixed upon an actuating disk 22 which can be shifted axially within certain limits but does not rotate. To facilitate the exchange of the linings 12' and 12'', they are attached to the stand 21 and to the disk 22, respectively, by screws 24 (FIGS. 2 and 3). The actuating disk 22 with its lining 12'' can be applied to a lining 12 of the disk 10 and the other lining 12 can be applied to the lining 12' fixed to the stand 21 by shifting the disk 22 by means of a hydraulic driving cylinder (not shown) or the like and by applying it axially in the direction of the arrow 26.

The linings 12, 12' and 12'' are plates made of a suitable friction metal. They are carried by their supporting members only upon a part of their rear surface; for example, as shown in FIGS. 2 and 3, the lining 12'' is supported upon the plate 22 by a ledge-like projection 28, small round projections 30 and annular projections 32 which enclose the holes for the screws 24. The holes for the screws are located close to one radial edge of the lining. The linings 12 and 12' are similarly constructed. This construction diminishes on one hand, heat transmission between the brake linings and their supporting members and, on the other hand, provides better cooling facilities for the rear surfaces of the brake linings, since cooling air under pressure can flow through channels 42 extending between the projections 28, 30 and 32.

The lining 12'' is provided with a longitudinally extending flange 38 located upon the edge directed away from the screws 24 and overlapped by a corresponding flange 40 provided upon the adjacent lining. The active front surface of the lining is divided into preferably quadrangular sections 34 separated by grooves 36 which intersect each other and extend in radial as well as circumferential directions. These grooves also constitute cooling channels. As already stated, the other linings have the same construction.

The separation of the active surface of the lining into small sections has the advantage that it prevents the appearance of detrimental heat surface tensions in the lining and the resulting permanent heat deformations and the creation of cracks. The grooves 36 serve as cooling channels. Furthermore, this construction results in a substantially greater heat transmitting surface of the lining.

In general, the advantage of the construction of the present invention is that only a very small amount of heat is transmitted to the members carrying the linings. Furthermore, the continuous surfaces of the linings are so small that they are not deformed by heat shocks. No heat tensions in the linings can be transmitted to their supports.

It is apparent that the illustrated example is subject to various modifications within the scope of the present invention. For example, if the brake load is small, the disk 10 and its linings 12 can be replaced by a single disk the brake surfaces of which are divided into quadrangular sections in the manner illustrated in connection with the lining 12''. Then the cooling is somewhat greater than would have been the case with a completely smooth disk, while heat tensions upon the outer surface are cut off, so that thermic deformation is prevented to a substantial extent. It is also possible to replace the pressure stand 21 and the pressure disk 22 with a brake clutch having, for example, an organic lining. All such and other variations and modifications are to be included within the scope of the present invention.

What is claimed is:
1. In a disk brake having a rotary disk and an actuating disk cooperating therewith; opposed brake linings carried by said disks and consisting of plates of friction metal, each of said linings having a front active surface with a plurality of intersecting grooves constituting cooling channels and dividing said front surface into a plurality of sections, and a rear surface having projections engaging the disk carrying the lining, whereby other cooling channels are formed between said projections, each of said disks carrying a plurality of linings, each of said linings having two opposed radially extending end flanges, one of said flanges having a thickness substantially equal to the distance of the other flange from the underlying disk, whereby said one flange is engaged and pressed against the underlying disk by the other flange of the adjacent lining, and screws attaching the linings to their disks, each of said linings carrying screws disposed adjacent that flange of the lining which is its front flange in relation to the direction of rotation.

References Cited

UNITED STATES PATENTS

| | | | |
|---|---|---|---|
| 1,936,240 | 11/1933 | Lane | 192—107 |
| 2,708,492 | 5/1955 | Helsten | 188—218 |
| 2,728,422 | 12/1955 | Kelley | 188—218 X |
| 2,767,817 | 10/1956 | Davis. | |
| 2,837,181 | 6/1958 | Kelley | 188—264 |
| 3,002,595 | 10/1961 | Weir | 188—264 X |
| 3,249,189 | 5/1966 | Schjolin et al. | 192—113 X |

GEORGE E. A. HALVOSA, Primary Examiner

U.S. Cl. X.R.

188—218; 192—107, 113